July 7, 1931.  E. M. FRASER  1,813,394
INDUCTOR WINDING AND METHOD OF MAKING SAME
Original Filed Nov. 16, 1925
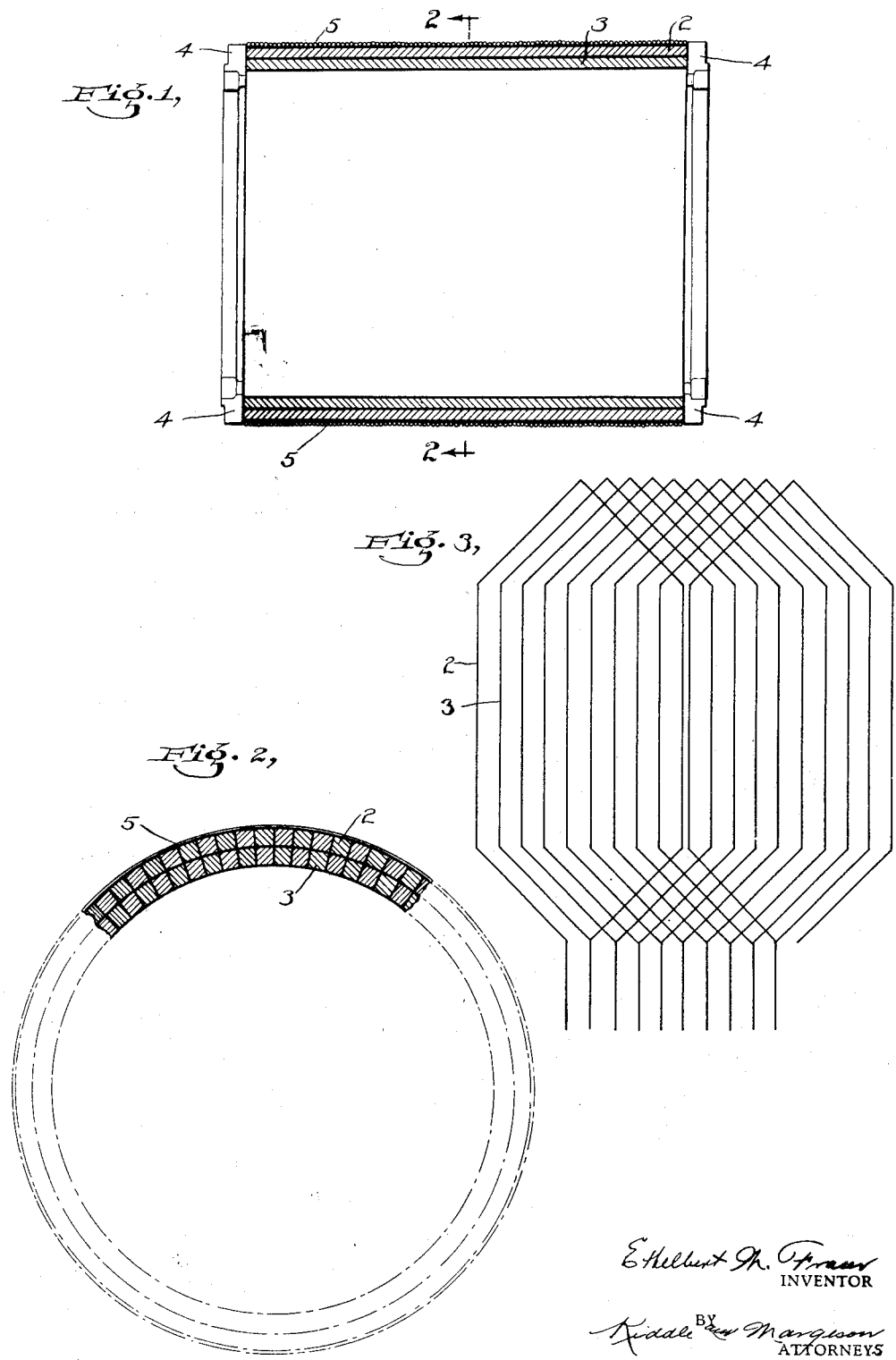

Patented July 7, 1931

1,813,394

UNITED STATES PATENT OFFICE

ETHELBERT M. FRASER, OF YONKERS, NEW YORK

INDUCTOR WINDING AND METHOD OF MAKING SAME

Original application filed November 16, 1925, Serial No. 69,236. Divided and this application filed February 15, 1928. Serial No. 254,349. Renewed April 2, 1931.

This invention relates to inductor windings and method of making the same, and has for one of its objects an improved inductor winding, as an article of manufacture, and an improved method of making the same, the conductors being built up into a unitary self-sustaining structure eliminating the use of a core, or laminations of magnetic conducting material as a supporting medium.

One embodiment of my improved inductor winding is illustrated in the accompanying drawings in which Fig. 1 illustrates diagrammatically a longitudinal section of the winding;

Fig. 2 is an enlarged section of a part of the winding taken on the line 2—2 of Fig. 1;

Fig. 3 is a development showing one arrangement of the conductors of the inductor winding.

In the making of my improved inductor winding, it is to be understood that the same may take any shape desired, but I preferably make the same in cylindrical form.

Referring to the drawings, 1 designates the inductor winding comprising a plurality of conductors 2, 3, the ends of each conductor being secured to clips 4, each of which is secured to a commutator bar. The other end of the inductor winding is also preferably secured to like clips 4, or if desired to a ring or other suitable supporting member.

In Fig. 2 the conductors are shown insulated from each other, the insulation being applied during the construction of the winding as hereinafter described.

Fig. 3 illustrates one method of winding that may be employed although it should be understood that I do not limit myself to this particular arrangement as my invention permits any desirable system of winding to be used.

In the practice of my improved method, the conductors 2, 3 are wound preferably upon a cylindrical collapsible form (not shown) which may be of any suitable material, it being understood that the conductors of the winding may be disposed upon the form in any manner desired, although preferably the conductors should overlap or interlace when the winding is completed.

During the winding operation a suitable insulating material that will harden under heat, such as bakelite, is preferably applied to the conductors so that they will be insulated from each other.

After the conductors are wound upon the collapsible form and the winding completed, the form and the winding thereon are submerged in bakelite or other suitable insulating material and after the winding has been suitably impregnated, the form which the winding thereon is placed in an oven and subjected to heat of a sufficient temperature and for a sufficient length of time to cause the insulating material to be hardened. The form is then collapsed and removed from the winding leaving a cylindrical structure comprising overlapped or interlaced conductors bound or held to each other by the hardened insulating material.

The foregoing method results in an inductor winding of such a character that no core or lamination of any kind is needed for its support. This winding I have found to be very strong and it may be subjected to high electrical stresses without breaking down. I find also that by reason of this construction and the elimination of a core or laminations universally employed in connection with inductor windings, that excessive heating is avoided. My improved method also provides a winding in which the weight has been reduced to a minimum which is also of advantage as will be understood by those skilled in this art.

Inasmuch as the type of collapsible core employed in manufacturing the winding is immaterial so far as its construction and shape are concerned, I have deemed it unnecessary to illustrate the form by way of a drawing or drawings.

If desired, the winding after completion may be wound with piano wire 5 for example, either before or after the collapsible form has been removed, and if the wire is applied before the collapsible form has been removed, it may be applied either before or after the heating step of my improved process. This piano wire may be wound closely on the winding or the turns thereof may be spaced apart just as desired.

From the foregoing it will be seen that I have provided an improved inductor winding which is self-sustaining and free of any magnetic supporting material such as an iron core or laminations, and an improved method for making the same.

This application is a division of my co-pending application Serial No. 69,236, filed November 16, 1925, for improvements in electrical machines.

What I claim is:—

1. An inductor winding comprising a hollow cylindrical structure made up of conductors held together in the form of a unitary structure and insulated from each other by heat-hardened insulating material, and wire wrapped about said winding to strengthen the same.

2. In the manufacture of inductor windings, the method which consists in disposing a plurality of conductors upon a collapsible core, impregnating the winding with an insulating material, subjecting the impregnated winding to heat for a sufficient length of time to harden the insulating material, wrapping wire about the winding to strengthen the same, and then removing the collapsible core.

3. In the manufacture of inductor windings, the method which consists in disposing a plurality of conductors in overlapping relation upon a collapsible form, submerging the same together with the form in an insulating solution to insulate the conductors of the winding from each other and to fill the voids between the conductors, subjecting the windings thus treated to heat to harden the insulating material, wrapping wire about the winding to strengthen the same, and finally removing the collapsible form to provide a hollow cylindrical inductor winding depending for its support upon the solidified insulating material.

This specification signed this 2nd day of February 1928.

ETHELBERT M. FRASER.